July 1, 1969  M. E. KISE  3,452,476
CONNECTOR AND SUPPORT FOR NATURAL FLOWERS
Filed March 30, 1967
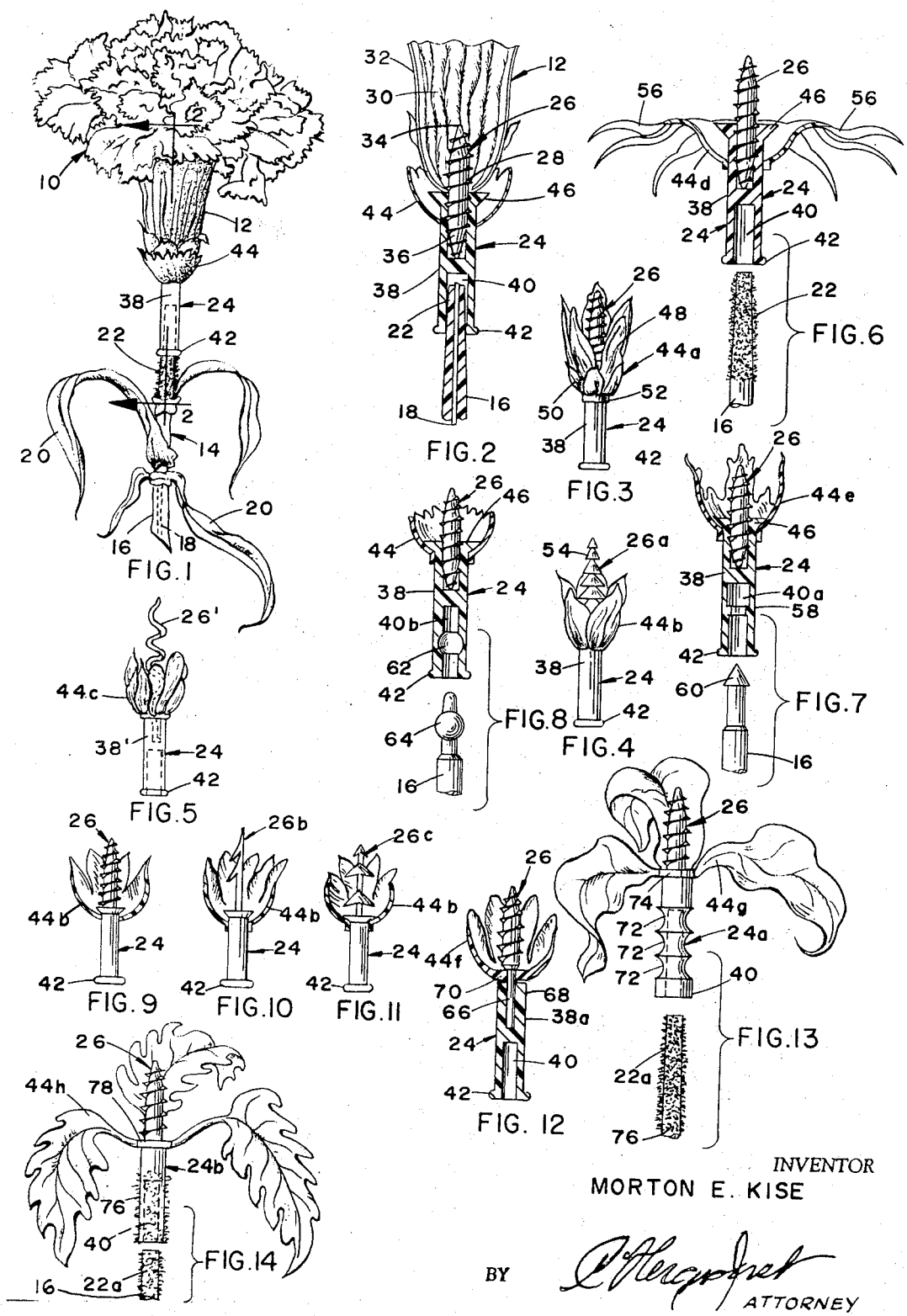
INVENTOR
MORTON E. KISE
BY
ATTORNEY 15 Claims 3,452,476
CONNECTOR AND SUPPORT FOR
NATURAL FLOWERS
Morton E. Kise, 433 N. Newberry St.,
York, Pa. 17404
Filed Mar. 30, 1967, Ser. No. 627,058
Int. Cl. A01g 5/00; A41g 1/00; A47g 7/00
U.S. Cl. 47—55

ABSTRACT OF THE DISCLOSURE

Connecting means for purposes of attaching a natural flower to an artificial supporting stem-like means to facilitate florists in preparing various types of floral arrangements and bouquets with minimum effort and consumption of time to provide the scent of natural flowers therein. Essentially, the connecting means is a member having piercing means to penetrate and interlock with the calyx of a natural flower and also having attaching means engageable with artificial supporting stem-like means.

Cross-reference to related application

The invention comprising the subject matter of the present application is an improvement over the invention in applicant's co-pending application Serial No. 498,280, filed Oct. 20, 1965, now U.S. Patent No. 3,318,044.

Background of the invention

Present practice of florists in preparing various types of floral arrangements, bouquets and the like comprising natural flowers require auxiliary means to position the various flowers in desired relationship in such floral arrangements. This necessitates the use of wires which are attached to the flowers usually by spirally winding the wires along the stems of the flowers in order that the flowers, when positioned in a desired arrangement, may be maintained in a desired location with respect to adjacent flowers through the suitable bending or positioning of the wires on the individual flowers to achieve the desired result. Extensive amounts of time are consumed in the monotonous and laborious chore of attaching such wires to natural flowers, usually by relatively high paid workers, thereby resulting in the labor cost of such floral preparations representing a substantial proportion of the total cost, as well as rendering such preliminary preparation of the flowers a boring and uninteresting task for persons othedwise interested primarily in creating artistic and esthetic arrangements.

Various types of devices have been conceived heretofore, primarily for purposes of attaching natural flowers, either with or without the natural calyx remaining thereon, to different types of artificial supporting means. Most of these prior attempts have left much to be desired from the esthetic standpoint. Such prior efforts also have failed to utilize many advances recently made in the production of artificial flowers and plants from molded plastic or synthetic resin materials which now are available for this purpose. Typical examples of such prior attempts referred to above are represented by the following patents: 144,446, Craig, 1873; 2,331,440, Thomas, 1943; 2,350,-268, Zuckerman, 1944; 2,390,858, Walker, 1945.

Summary of the invention

The principal object of the present invention is to provide inexpensive and simple connecting means primarily having two essential features thereon respectively at opposite ends of such means. The preferred embodiment of said connecting means comprises a member having on one end thereof one of said features which is a piercing means operable to penetrate the outer end of the calyx of a natural flower from which the stem has been cut and also being operable to interlock with the interior of said natural calyx. The other feature is on the opposite end of said member and comprises attaching means engageable with artificial supporting stem-like means by which the natural flower is to be supported in a desired position with respect to other adjacent flowers or customary related items such as leaves, ferns or similar greenery which frequently are employed to embellish the overall floral arrangement.

The piercing means of the present invention are produced in a number of different forms, certain of which have greater applicability to certain types of flowers, while other forms of said piercing means have greater applicability to different types of flowers than those first mentioned. By way of example, one type of such piercing means comprises a spirally threaded element upon which the lead of the threads is relatively coarse so as to provide suitable space between the successive convolutions of the threads to accommodate the pulp-like or pithy interior material of the natural calyx of various types of flowers. Another type of piercing means comprises several different arrangements of barbs, or the like, which are so arranged that they readily may be inserted in one direction into the outer end of the calyx of a natural flower yet coengage with the interior of the calyx and interlock therewith incident to attempting to withdraw the barb from the calyx, this function being similar to that of the barbs on fishhooks.

The opposite end of such connecting member also may be in a number of different forms of attaching means which are engageable in a complementary manner to artificial stem-like means of which many types and arrangements are now available and are molded from plastic or synthetic resin material. Usually they are reinforced by internal wires either molded, in situ, or inserted therein after the stem-like means have been molded. In the preferred construction of such attaching means, they are preferably in the form of somewhat elongated sockets and, to facilitate the attachment thereof with such artificial supporting stem-like means, various types of friction-producing arrangements may be provided thereon for engagement by the fingers of the operator.

By providing such connecting means or members with the two principal features described above, it is possible to substantially completely eliminate the present monotonous drudgery of "wiring" natural flowers by presently employed methods incident to preparing various floral arrangements and bouquets which include such natural flowers. In lieu thereof, it is only necessary to quickly snip the stems from the natural flowers adjacent the outer ends of the calyx of each and then quickly insert the piercing means of such connecting members in a manner which effectively prevents ready separation of the flower from the connecting means even when such flowers are extensively shaken.

After said piercing means have been inserted in the natural calyx of each flower, it is then only necessary to quickly affix the attaching means of said connecting member on each natural flower to artificial supporting stem-like means. In the preferred embodiment thereof, such stem-like means comprises a projecting member of suitable length and molded from appropriate plastic material, reinforced or otherwise, the same being complementary in size to the socket of the attaching means which preferably frictionally receives said projecting member. Various types of snap-acting separable locking means may be utilized if desired. Particularly when wire-like reinforcing means are included with the artificial supporting stem-like means, said wire may be bent as desired to arrange the natural flowers supported by said stem-like means in desired association with other flowers or customary auxiliary means such as leaves, ferns, or other characteristic embellishing greenery normally employed by florists for such purpose.

Description of the drawing

FIG. 1 is a side elevation of an exemplary natural flower affixed by one embodiment of connecting means employing the principles of the present invention to a fragmentarily illustrated embodiment of artificial stem-like means.

FIG. 2 is a fragmentary vertical sectional view of the flower arrangement shown in FIG. 1 as seen on the line 2—2 of said figure.

FIG. 3 is a side elevation of an embodiment of connecting means made in accordance with the principles of the present invention but different from that illustrated in FIGS. 1 and 2.

FIG. 4 is a view similar to FIG. 3 but illustrating a still further embodiment of connecting means utilizing the principles of the present invention.

FIG. 5 is another view similar to FIGS. 3 and 4 but showing a still further embodiment of connecting means employing the principles of the present invention.

FIG. 6 is a vertically sectioned exploded view of a still further embodiment of connecting means utilizing the principles of the present invention and showing one embodiment of artificial supporting stem-like means in position to be engaged by said connecting means.

FIG. 7 is a view similar to FIG. 6 but illustrating a still further embodiment of connecting means and an additional embodiment of artificial supporting stem-like means in position for coengagement of the same.

FIG. 8 is still another view similar to FIGS. 6 and 7 and showing details of a still further embodiment of connecting means and still another embodiment of artificial supporting stem-like means arranged in position to be coengaged for interconnection of the same.

FIGS. 9, 10 and 11 respectively are side elevations of connecting means on which artificial auxiliary embellishing means are illustrated in vertical section and said figures respectively illustrate different embodiments of piercing means which are engageable with the calyx of natural flowers.

FIG. 12 is a vertical sectional view of still another embodiment of connecting means in accordance with the invention in which artificial auxiliary embellishing means are supported upon the connecting means in a different manner from that illustrated in FIGS. 9–11, particularly for purposes of permitting relative rotary movement between said embellishing means and the connecting means.

FIGS. 13 and 14 are exploded side elevations of different embodiments of connecting means with which different types of artificial auxiliary embellishing means are associated and the attaching means of said connecting means in said figures respectively illustrate different embodiments of manually engageable arrangements to facilitate frictional engagement thereof by the fingers of an operator.

Description of the preferred embodiment

Referring to FIG. 1, an exemplary natural flower 10 is illustrated, the same representing a carnation. It is to be understood, however, that the present invention pertains to practically all types of natural flowers having a natural calyx 12 thereon. There is also illustrated in FIG. 1 an embodiment of artificial supporting stem-like means 14 which may be formed from any of a number of different types of synthetic resins, commonly referred to as plastics material. The stem-like means 14 includes a stem portion 16 which may be reinforced with an internal wire, if desired, extending substantially the entire length of the stem portion 16. It is to be understood that, under normal conditions, the stem portion 16 will be of extensive length, the same being represented only somewhat fragmentarily in FIG. 1. The stem-like means 14 also includes a number of artificial leaves or blades 20 which are connected to the stem portion 16 in accordance with present manufacturing techniques employed in the production of artificial, so-called "permanent" type flowers. The outer end 22 of the stem portion 16 is suitably formed, preferably with friction-like surface means for purposes to be described.

Particularly in floral bouquets suitable for brides and their attendants, holiday corsages, nosegays, corsages and wristlets for dances and floral arrangements for funerals, it is presently customary and highly desirable that at least the blooms of natural flowers be used, particularly to supply the scent of such natural flowers. Artificial flowers in which the bloom or flower portion, as well as the stem and leaf means, now are produced in highly lifelike manner so that even at a short distance, it is difficult to distinguish the same from comparable natural flowers which the artificial flowers represent. Such artificial flowers are useful under many circumstances for purely decorative purposes but, thus far, such artificial flowers have not been produced which possess the scent of such natural flowers they represent.

Artifical stems and attached leaves or blades made in accordance with the present techniques are utilized in connection with the present invention for several purposes such as standardizing the finished product, even though assembled by different personnel in a floral shop. Another purpose is to minimize, if not substantially eliminate, the present very monotonus and unprofitably time-consuming practice of attaching supporting wires to natural flowers and spirally winding the same along the stems thereof prior to arranging such "wired" flowers in a desired floral arrangement. Inasmuch as it is only natural flowers that supply the natural scent, the elimination of the natural stem and leaf or blade arrangements from the natural flowers per se in no way deprives a floral arrangement from the desired natural scent and beauty of the natural flowers. Accordingly, the use of artifical supporting stem-like means is advantageous in the present invention for purposes of eliminating such present boring and uninspiring laborious practice of wiring natural flowers for use in bouquets and the like.

The principal feature of the present invention comprises a connecting means 24, a number of embodiments of which are illustrated on the attached drawing and described hereinafter. Said connecting means is for the purposes of quickly attaching the calyx 12 of a natural flower 10 to the outer end 22, for example, of an artificial supporting stem-like means 14, whereby the overall result as illustrated in exemplary manner in FIG. 1 is of a highly pleasing and esthetic nature. Such combination provides all of the beauty of a complete natural flower of the type represented by the quickly connected artifical stem-like means 14 with the natural flower 10, and particularly providing the scent of the natural flower 10.

The artificial stem-like means 14 is of such nature that it readily may be utilized in the same manner as a natural flower from which the stem has not been removed but which is "wired" for purposes of permitting desired positioning of the same with relation to adjacent flowers and supplementary embellishing means such as additional "greenery" comprising fronds, ferns, asparagus greens, and the like. That is, the artifical stem 16, particularly when reinforced with wires 18, are sufficiently stiff to be supported as desired and also may be bent to position the natural bloom 10 in any desired relationship with adjacent flowers or otherwise, in the same manner that wired entire natural flowers may be utilized in normal floral arrangements, bouquets, corsages, and the like, but without the attending monotonous drudgery of attaching the wires to such natural flowers as is now required in accordance with customary practice by florists.

Referring to FIG. 2 in which the general details of applicant's connecting means are illustrated more extensively than in FIG. 1, it will be seen that the exemplary embodiment of connecting means 24 shown therein comprises one embodiment of piercing and interlocking means 26 which is in the form of a threaded elongated member having a spirally arranged thread thereon but which, for the purposes of the present invention, preferably has threads in which the adjacent convolutions are axially spaced a substantial distance for purposes of accommodating within said spaces therebetween the generally pithy and usually non-solid internal material of the natural calyx 12 so as to effect interlocking engagement between the piercing means 26 and the natural calyx 12 to such an extent that even appreciable shaking of the natural flower 10 with respect to the connecting means 24 will not result in separation of the same.

One suitable embodiment of piercing means 26 has been found by experiment to comprise threaded arrangements similar to those used on so-called self-tapping screws of the type used in sheet metal work, as distinguished from so-called wood-screws. In such self-tapping screws, the convolutions of the spiral threads are spaced apart a greater distance than in regard to the convolutions of wood-screws, whereby the spiral grooves 28 between the threads are of an appreciably greater width than the corresponding grooves in wood-screws and thus afford adequate accommodation for the pulpy and pithy interior material 30 of natural calyx 12.

The somewhat fibrous enclosing shell 32 of the calyx 12 is of a much more stable and firm nature than the interior contents 30, whereby when the natural stem of the natural flower 10 is severed from the outer end of the calyx 12, usually a relatively small opening comprising the interior of the base end of the generally tubular natural stem is exposed for the ready reception of the preferably pointed penetrating extremity 34 of the piercing means 26 so that, upon relative rotation between the calyx 12 and the piercing means 26, a satisfactory, firm connection is produced.

The opposite end portion 36 of the connecting means 24 from the penetrating extremity 34 may, if desired, be similarly threaded or, in any event, formed with means which will coengage with the body portion of connecting means 24. Such body portion preferably is formed from suitable synthetic resin, or plastics material which, in the preferred embodiment of the invention, is at least of a limited pliable nature such as is afforded by such synthetic resins as poly-ethylene or the equivalent. The body portion 38 of the connecting means 24 may be suitably molded from appropriate synthetic resin material, the same being appropriately tinted to resemble the color of the stem from which the natural flower 10 has been severed. Incident to forming the body portion 38 by suitable molding, the same also is provided preferably with attaching means at the end of the connecting means opposite the piercing means 26. The preferred embodiment of attaching means comprises a socket 40 which is complementary to the outer end 22 of the stem portion 16, for example, and is capable of frictionally receiving the same, as is illustrated in exemplary manner in FIGS. 1 and 2.

The end of connecting means 24 which includes the attaching means such as socket 40, also preferably is provided with appropriate gripping means to facilitate the manual engagement of the connecting means 24 for frictional attachment thereof to the stem-like means 16 and especially the outer end 22 thereof. One embodiment of such gripping means is illustrated in FIGS. 1 and 2 and is in the form of a terminal, annular flange 42 which may conveniently be formed incident to molding the connecting means 24, at which time the socket 40 also is formed. Such flange is integral with the body of the connecting means and is preferably of the same color and formed as inconspicuously as possible so as to be unobvious and thus not detract from the appearance of the floral arrangement. The preferred method for coengaging the connecting means 24 with the outer end 22 of stem portion 16 is to effect relative axial movement between the two elements for purposes of firmly placing the outer end 22 within the socket 40 so as to frictionally connect the same in such manner that even relatively vigorous shaking of the attached flower 10 with respect to the artificial stem portion 16 will fail to separate the same. It is to be understood, of course, that under normal circumstances, relatively little shaking of the attached natural flower and artificial stem 16 will occur in normal use.

Particularly for purposes of esthetic results, as well as augmenting and facilitating the physical connection between the connecting means 24 and calyx 12 of the natural flower 10, connecting means 24 is provided with artificial auxiliary embellishing means 44, one embodiment of which is illustrated specifically in FIGS. 1 and 2. Such embellishing means, as illustrated in said figures, preferably is somewhat cup-like and formed from synthetic resin or plastics material, similar to that from which the body portion 38 is formed. Preferably, the embellishing means 44 is in the form of a partial or complete auxiliary calyx and is complementary in shape at least to the outer end of the natural calyx 12 for purposes of partially enclosing at least the outer end of the natural calyx 12 when the connecting means 24 has been completely attached to the natural calyx 12. An exemplary showing of such arrangement is illustrated in FIG. 1, while in FIG. 2, the embellishing means 44 is shown in somewhat incompletely assembled relationship with respect to the natural calyx 12.

The artificial auxiliary embellishing means 44 may be formed either integrally with the body portion 38 of connecting means 24 or separately, as desired. Especially when the auxiliary means 44 is formed separately from body portion 38, it is provided with a central aperture to receive the body portion 38 and said apertured end preferably is complementary to an annular, frusto-conical extremity 46 which is integrally molded on the body portion 38 and prevents outward axial separation of the embellishing means 44 with respect to body portion 38 after the same has been attached thereto.

The central aperture of means 44 also preferably is so dimensioned with respect to the outer diameter of body portion 38 that limited rotation between the body portion 38 and means 44 is possible. Normally, the embellishing means 44 is disposed in contact with the extremity 46 of body portion 38, rather than in spaced relationship as illustrated in FIG. 2 but, upon inserting the piercing means 26 within the natural calyx 12 to its full extent, such as by abutting extremity 46 against the cut end of calyx 12, it will be found that the cup-shaped embellishing means 44 will closely receive the outer extremity of natural calyx 12. However, in the event such engagement of the embellishing means 44 with the cut end of calyx 12 occurs before complete coengagement between the piercing means 26 and calyx 12, limited rotatable or slidable movement may occur between means 44 and the calyx 12, if necessary, especially to prevent damage to the natural calyx by such complete engaging movement of the connecting means 24 with the calyx 12. The firm reception of the outer extremity of the calyx 12 within the cup-shaped embellishing means 44 further enhances the connection between the natural flower and the connecting means 24 by closely confining the outer extremity of the calyx around the piercing means 26 and thereby further preventing relative separation therebetween.

The artificial auxiliary embellishing means 44 may be arranged in various forms, particularly to render the same harmonious with particular types of flowers. Hence, whereas the cup-shaped embodiment shown in FIGS. 1 and 2 may be appropriate for certain flowers such as the carnation selected as an exemplary illustration for natural flower in FIGS. 1 and 2, it may be more desirable to have other types of embellishing means for flowers different from that shown in FIGS. 1 and 2. In this regard, therefore, attention is directed to FIG. 3 wherein it will be seen that the connecting means 24 illustrating therein, which may be similar to the connecting means shown in FIGS. 1 and 2, is provided with embellishing means 44a comprising a plurality of different lengths of petal-like elements 48 and 50. Said elements are connected flexibly to a supporting ring 52, which preferably frictionally surrounds the body portion 38 of connecting means 24 and may be flexed radially outward desired amounts incident to interlockingly engaging the piercing means 26 with the calyx 12 of a natural flower 10. The elements 48 and 50 may be formed from suitably tinted material of a type similar to that from which the body portion 38 is formed, or otherwise. Also, the elements 48 and 50 as well as the supporting ring 52 may either by separably molded and coengaged with the body portion 38 or integrally molded therewith, as desired.

Referring to FIG. 4, a different embodiment of piercing means is shown, the same comprising a series of barb members 54, of either a flat or somewhat circular configuration in cross-section, which are projectable longitudinally into the cut extremity of a natural calyx 12, while a still further embodiment of embellishing means 44b is illustrated in connection with the body 38 to illustrate a still further embodiment thereof.

In FIG. 5, the connecting means 24 shown therein has a body portion 38 similar to the preceding embodiments but a still further embodiment of piercing and interlocking means 26' in the form of a rigid wire or plastic spiral resembling a cork-screw, the inner end of which may be interlocked by molding it in situ, with the plastic body 38. Suitable embellishing means 44c are also attached to body 38.

Referring to FIG. 6, an exploded representation of connecting means 24 is shown, the same being similar to that illustrated in FIGS. 1–3 for connection to an exemplary stem portion 16 having an outer end 22 which is suitably roughened such as by the provision of a multitude of small projecting spines thereon for very effective frictional engagement with the inner wall of socket 40 of connecting means 24. In this illustration, however, a still further embodiment of artificial auxiliary embellishing means 44d is shown which is preferably arranged for relative movement with respect to the body portion 38, longitudinally as well as rotatably. However, the embellishing means 44d preferably comprises radially extending leaf-like projections 56 to resemble certain types of similar natural projections extending from the calyx of certain types of natural flowers, whereby this particular embodiment of embellishing means will be quite life-like with respect to such natural flowers. It will be understood that the embellishing means 44d as well as the projections 56 on the cap-like central portion are formed from appropriately tinted material similar to that, for example, from which the body of the connecting means 24 is formed.

In FIG. 7, comprising an exploded view similar to FIG. 6, a still further embodiment of connecting means 24 is illustrated in which the same type of exemplary piercing means 26 is shown as in certain of the preceding figures. However, in FIG. 7, the body portion 38 is provided with a socket 40a in which an annular constriction 58 is formed incident to molding the body portion 38. Also in said figure, it will be seen that the stem portion 16 is provided on its outer end with a conical interlocking end 60 which may be inserted through the constriction 58 of body portion 38 and snap against the annular inner surface thereof so as to interlock therewith and thus securely attach the connecting means 24 with the artificial stem portion 16. Also in this embodiment, a still further exemplary embodiment of embellishing means 44e is illustrated, the same being connected to the body portion 38 in similar fashion to the embellishing means 44d in FIG. 6, for example.

Still another embodiment of attaching means for the connecting means 24 is shown in the exemplary illustration of FIG. 8 in which it will be seen that the principal elements of the connecting means are similar to those shown in preceding embodiments, the principal difference residing in the socket 40b having an internal enlargement 62 which interlockingly receives an exterior enlargement 64 of complementary size which is formed on the outer extremity of stem portion 16 shown in said figure. It will be readily appreciated that relative longitudinal connecting movement between the stem portion 16 and connecting means 24 will result in the exterior enlargement 64 being received somewhat with a snap-action within the interior enlargement 62 and thus effectively secure the connecting means 24 to the artificial stem 16 and thereby connect the natural flower 10, which previously has been secured to the connecting means 24, to the artificial stem 16.

FIGS. 9, 10, 11 respectively illustrate exemplary different embodiments of piercing means 26, 26b and 26c. Piercing means 26 shown in FIG. 9 is similar to that shown in the threaded version of connecting means illustrated in the preceding embodiments. However, in FIG. 10, the piercing means 26 is made in the form of a plurality of barbs, similar to those employed on fishhooks, mounted in longitudinal arrangement and disposed at one side of the axis of said piercing means for engagement with the interior of the natural calyx 12 of a flower 10 when axially projected into the cut outer end of such calyx. In FIG. 11, the illustrated embodiment of piercing means 26c is similar to that shown in FIG. 10, except that the barbs respectively extend radially in opposite directions from the axis of the piercing means for effective interlocking engagement with the interior of a natural calyx 12 of a flower.

Whereas the preceding embodiments illustrate various arrangements of artificial auxiliary embellishing means 44, 44a and 44b which are frictionally but rotatably engageable with the outer surface of the body portions 38 of said connecting means, the embodiment shown in FIG. 12 is different. By reference to said figure, it will be seen that the inner end 66 of the illustrated piercing means 26 is reduced in diameter and fixedly connected to the upper end of body portion 38a. The reduced diameter of inner end 66 extends beyond the upper end 68 of body portion 38a to provide a space to receive the apertured central portion 70 of embellishing means 44f in such manner as to permit relatively free rotation therebetween.

When the piercing means 26 is being engaged interlockingly with the natural calyx 12 of a flower and the embellishing means 44f engages the outer end of the natural calyx 12, it may cease rotation relative to the same and yet permit continued rotation of the connecting means 26, thus eliminating any possibility of damage occurring by reason of the engagement of the embellishing means 44f with the outer end of natural calyx 12. In this embodiment of the invention, the socket 40, for example, may be similar to the socket 40 of the preceding embodiments and especially those shown in FIGS. 2 and 6, the exterior of said socket and of the connecting means 24 also preferably including exterior gripping means 44 such as those Referring to FIG. 13, wherein an exemplary exploded representation is shown of still another embodiment of connecting means 24a which is in position to receive the outer end 22a of artificial stem portion 16, it will be seen that the exterior portion of connecting means 24a is different from the preceding embodiments. In FIG. 13, the exterior surface of connecting means 24a is provided with a series of longitudinally arranged annular concavities 72 which affords excellent means to be frictionally engaged by the fingers of an operator incident to arranging the connecting means in supporting engagement with the artificial stem portion 16.

In the embodiment of FIG. 13, the piercing means 26 is shown in exemplary manner as being similar to the piercing means 26 in certain of the preceding embodiments. Further, a still added arrangement of embellishing means 44g is illustrated which is represented as comprising a plurality of leaves of substantial size shown in an artistic arrangement, the same extending outward, for example, from a collar, which preferably is rotatable about the axis of the connecting means 24a. The outer end 22a of the artificial stem portion 16 as illustrated in FIG. 3 also is shown as being provided with an extensive plurality of small spine-like projections to insure firm frictional engagement with the interior of the cavity 40 formed in the body of the connecting means 24a.

In FIG. 14, a still further embodiment of connecting means 24b is shown in which the exterior of the body portion thereof which surrounds the socket 40 is provided with a different embodiment of frictional means 76 which may be manually engaged by the fingers of the operator incident to affixing the connecting means 24b to the stem portion 16. In this embodiment, the outer end 22a of the stem portion 16 is similar to that illustrated in detail in FIG. 13, while the piercing means 26 is similar to the other threaded type piercing means shown in certain of the preceding figures. A still different embodiment or arrangement of embellishing means 44h is illustrated in the embodiment shown in FIG. 14, the same being in the form of different types of leaves from those illustrated in the preceding embodiments and especially in FIG. 13, thereby to adapt the embodiment of FIG. 14 to certain types of flowers with which the illustrated types of leaves are harmonious. Said leaves may be supported by an appropriate collar 78 which surrounds the axis of the connecting means 24b and preferably is rotatable with respect thereto.

In regard to all of the preceding embodiments of connecting means, it will be seen that the same each comprise two essential features respectively located at opposite ends of a somewhat elongated body means and consisting of a combination piercing and interlocking means on one end of said body member and attaching means on the opposite end of said body member. The combination piercing and interlocking means may be of a substantial variety, as illustrated, but the invention is not to be restricted solely to those specifically shown. Rather, other forms are intended to be encompassed within the terms of the claims as long as such means afford adequate internal friction with the natural calyx to resist ready separation of the natural flower from the connecting means.

The attaching means of the various embodiments cooperate with complementary means on the outer end of artificial stem-like means and in the preferred construction, comprise interfitting socket and projecting means which frictionally coengage. A further feature also preferably is included at least in most of the embodiments in the form of artificial auxiliary embellishing means which may either be integrally connected to the body member of the connecting means or rotatably and/or longitudinally movable with respect to the body member so as to engage and overlap the outer end portion of a natural calyx of a flower when attached to said connecting means. Lastly, gripping means of one form or another also preferably are provided on body portion 38.

While the invention has been illustrated and described in its several preferred embodiments, it is to be understood that the invention is not to be limited to the precise details herein illustrated and described since the same may be carried out in other ways falling within the scope of the invention as claimed.

I claim:

1. Connecting means to attach a natural flower to artificial supporting stem-like means comprising in combination, a connecting member having on one end a pointed piercing extremity adapted to penetrate the outer end of the calyx of a natural flower and said extremity having laterally extending means thereon shaped to engage the interior of said calyx and interlock therewith in a manner to resist withdrawal of said piercing extremity therefrom, and embellishing means rotatable and slidably movable longitudinally on the exterior surface of said connecting member and adapted to be moved toward said piercing extremity of said connecting member so as to be positioned adjacent the calyx of a natural flower when one of the same is attached to said piercing extremity of said connecting member, the opposite end of said connecting member having a socket extending longitudinally and coaxially thereinto and having an interior surface adapted to receive and frictionally coengage with one end of an artificial supporting stem-like member to connect said natural flower thereto for support thereby in a natural appearing manner.

2. The connecting means according to claim 1 in which said piercing extremity of said connecting means comprises a relatively rigid spiral resembling a cork screw, thereby offering minimum resistance to penetrating the calyx of a natural flower, and the outer extremity thereof being sharpened.

3. The connecting means according to claim 1 in which the exterior surface of said stem-like supporting member which is received in said socket of said connecting member is provided with a random arrangement of small spine-like projections to frictionally engage the surface of said socket.

4. The connecting means according to claim 1 in which said socket of said connecting means is provided with an interior enlargement and said end of said stem-like supporting member received therein is provided with an enlargement complementary to the enlargement in said socket and arranged to be received therein to provide a snap-fit connection between said connecting means and supporting member.

5. The connecting means according to claim 1 in which said piercing means has spiral thread means thereon capable of forming an opening in the calyx of a natural flower without the use of auxiliary means.

6. The connecting means according to claim 5 in which said spiral thread means have a relatively coarse pitch to provide substantial space between the convolutions thereof to receive portions of the interior of said calyx of a natural flower and thereby enhance the effective interlocking therewith.

7. The connecting means according to claim 1 in which said laterally extending means on said connecting member comprises barbs arranged to permit ready penetration of the calyx of a natural flower by said piercing means and interlock with the interior thereof to prevent withdrawal thereof from said calyx.

8. The connecting means according to claim 7 in which said barbs are arranged on opposite sides of the axis of said piercing means.

9. The connecting means according to claim 8 in which a plurality of said barbs are arranged in longitudinally spaced relationship on opposite sides of the axis of said piercing means.

10. The connecting means according to claim 1 in which the outer end of said stem-like means is formed with friction-like surface means movable substantially axially into said socket of said connecting member to effect frictional engagement therewith.

11. The connecting means according to claim 1 in which said socket-containing end of said connecting member has finger-engageable means thereon to facilitate the connection of said member with said artificial supporting stem-like means.

12. The connecting means according to claim 11 in which said finger-engageable means project outwardly from the exterior of said member to provide frictional engagement with the fingers of an operator.

13. The connecting means according to claim 1 in which said embellishing means are positioned between the opposite ends of said connecting member.

14. The connecting means according to claim 1 in which said embellishing means comprises an artificial calyx adapted to at least partially overlying the calyx of said natural flower.

15. The connecting means according to claim 1 in which said embellishing means comprise artificial leaf-like means projecting outwardly from said connecting member.

References Cited

UNITED STATES PATENTS

| | | | |
|---|---|---|---|
| 2,759,285 | 8/1956 | Bussert | 47—55 XR |
| 2,984,036 | 5/1961 | Adler | 161—21 XR |
| 3,208,701 | 9/1965 | Erickson | 248—27.8 |
| 3,219,374 | 11/1965 | Snell. | |
| 3,301,516 | 1/1967 | Bruno | 248—27.8 XR |

FOREIGN PATENTS

| | | |
|---|---|---|
| 733,264 | 5/1966 | Canada. |
| 428,686 | 4/1925 | Germany. |

ROBERT E. BAGWILL, *Primary Examiner.*

U.S. Cl. X.R.

161—26; 248—27.8; 287—126